United States Patent [19]
Christman

[11] Patent Number: 5,353,080
[45] Date of Patent: Oct. 4, 1994

[54] EXPOSURE-EQUALIZING SYSTEM FOR PHOTOGRAPHIC IMAGES

[76] Inventor: Ernest H. Christman, 1055 Matador SE., Albuquerque, N. Mex. 87123

[21] Appl. No.: 970,042

[22] Filed: Nov. 2, 1992

[51] Int. Cl.⁵ .................... G03B 7/085; G03B 19/12
[52] U.S. Cl. .................... 354/154; 354/432; 354/454; 359/241
[58] Field of Search ............ 354/202, 154, 432, 483, 354/454; 359/241, 244

[56] References Cited

U.S. PATENT DOCUMENTS

| | | | |
|---|---|---|---|
| 3,987,461 | 10/1976 | Kondo | 354/154 |
| 4,054,890 | 10/1977 | Shimomura | 354/227 |
| 4,114,172 | 9/1978 | Yao | 354/153 |
| 4,473,288 | 9/1984 | Onodera et al. | 354/154 X |
| 4,786,927 | 11/1988 | Lawther | 354/153 |
| 4,786,928 | 11/1988 | Lawther et al. | 354/153 |
| 4,831,452 | 5/1989 | Takanashi et al. | 359/241 |
| 4,968,127 | 11/1990 | Russell et al. | 351/44 |
| 5,002,369 | 3/1991 | Sakata | 359/244 |
| 5,030,985 | 7/1991 | Bryant | 354/432 |
| 5,202,786 | 4/1993 | Boyle et al. | 359/241 |
| 5,255,088 | 10/1993 | Thompson | 359/244 X |

OTHER PUBLICATIONS

Smith, G. P. Photochromic Silver Halide Glasses, Corning Glass.

Primary Examiner—Michael L. Gellner
Assistant Examiner—Jae N. Noh

[57] ABSTRACT

A transparent photochromic medium is placed before the film or film-equivalent of a camera or photographic imaging device such that a light exposure of the medium temporarily darkens it according to the different light values in the image. A subsequent exposure of the film is influenced by the intervening photochromic device so that the range of light is moderated, reducing over- and under-exposure of areas of the film.

2 Claims, 8 Drawing Sheets

EXPOSURE-EQUALIZING SYSTEM FOR PHOTOGRAPHIC IMAGES

FIELD OF INVENTION

This invention equalizes the imbalance of photographic exposure when diverse light values exceed the capacity of the imaging system to compensate. All aspects of the image are suitably exposed at the same time, despite a large range of object brightness.

PRIOR ART

Transparent media that reduce light transmission relative to ambient light are common. An example is the optical PHOTOGREY lens which contains chemical elements within the structure that darken in response to light, the darkening being relative to the intensity of exposure. PHOTOGREY is a registered trademark of the Corning Glass Works of Corning, NY.

Darkening of a transparent media in response to ambient light is the subject of U.S. Pat. No. 4,968,127 (Nov. 6, 1990, awarded to Russel, et. al.). The objective of this patent is to improve upon the darkening response time and the sensitivity to changes in ambient light as compared to PHOTOGREY lenses. This end is achieved by using a system of decreasing light transmission by placing together a liquid crystal plate with a polarizing filter. A photocell system detects changes in the total ambient light which then sends a current through the liquid crystal plate, causing the liquid crystals to change alignment relative to the polarizing axis of the filter. Said alignment change reduces the total light transmission. The patent was awarded for the novel application of liquid crystal: polarized filter technology to the field of light-responsive eyeglasses.

My invention is a novel way of utilizing the principle of photochromic media responding to light. A photochromic medium is placed within a camera apparatus and focused light darkens it to form an image. A subsequent exposure of the camera's film is moderated by the previously formed image, thereby modifying the luminosity extremes to achieve a more balanced picture.

SUMMARY OF THE INVENTION

A photochromic plate that temporarily decreases its transparency according to the incident light is interposed inside a camera in the optical path between the lens and the recording component of the photographic apparatus, such as the film. Said plate is exposed so that there is a darkening on the plate according to the light intensity of the objects of regard. Then the shutter exposes the film such that light traverses the previously exposed photochromic plate before reaching the film. Said light affects the film such that component overexposure and underexposure is moderated.

BACKGROUND

In photography, when there is a scene that has a wide range of illumination of objects, the exposure of the film is usually set to the most interesting subject. The other objects are either overexposed or underexposed.

My invention of an intervening photochromic plate that is pre-imaged prevents over- and under-exposure when the film exposure is made.

OBJECTS AND ADVANTAGES

Photochromic materials darken according to the incident light. A photochromic plate placed before the film area and exposed will darken relative to the incident light. A subsequent opening of the lens aperture with an opening of the camera's (focal plane) shutter will cause the light exposing the film to be moderated by the prior darkening of the photochromic plate. This will render bright objects less luminous proportionally to other objects. The exposure of the photochromic plate is longer relative to the exposure of the film in most instances due to the differences in their sensitivities to light.

The use of photochromic plates allows a better exposure of objects regardless of the contours of their borders. If a system were to expose sectors of the film sequentially, each according to an average exposure, the results would expose differently an object that occupied more than one sector of the film.

GRAPHICS

FIG. 1 is a schematic representation of a sagittal view of a standard reflex camera. No. 1 indicates the entire camera. No. 2 is the photochromic device further described in FIGS. 2, 3, and 4. No. 3 is a reflex mirror. No. 4 is the focal-plane shutter mechanism. No. 5 is a light meter array further described in FIG. 8. No. 6 represents the film. No. 7 is the forward shutter. No. 8 is the aperture. No. 9 is an interchangeable optical filter. No. 10 is the collective light meter further described in FIG. 8.

FIG. 2 represent a sagittal view of the photochromic device seen inside the camera in FIG. 1. No. 2 indicates the photochromic device. No. 12 indicates the anterior one-way mirror which passes light from anterior to posterior but not from posterior to anterior. No. 14 indicates photochromic glass that can be in multiple, separate plates. No. 16 represents the posterior standard mirror. No. 18 indicates a tracked holder for moving the plates and mirrors.

FIG. 8 is a schematic drawing of FIG. 1, No. 5., there seen in sagittal view. No. 5 is a light meter array. No. 52 is an area of the light meter array that reflects light onto the remote light meter represented by No. 10 in FIGS. 1 and 8. No. 54 is an individual light meter on the array. No. 56 is an electrical connection between the remote light meter represented by No. 10 and the array represented by No. 5.

DETAILED DESCRIPTION OF INVENTION

In describing a preferred embodiment of the invention illustrated in the drawings, specific terminology will be resorted to for the sake of clarity. However, the invention is not intended to be limited to the specific terms so selected, and it is to be understood that each specific terms includes all technical equivalents which operate in a similar manner to accomplish a similar purpose.

Figure 1:
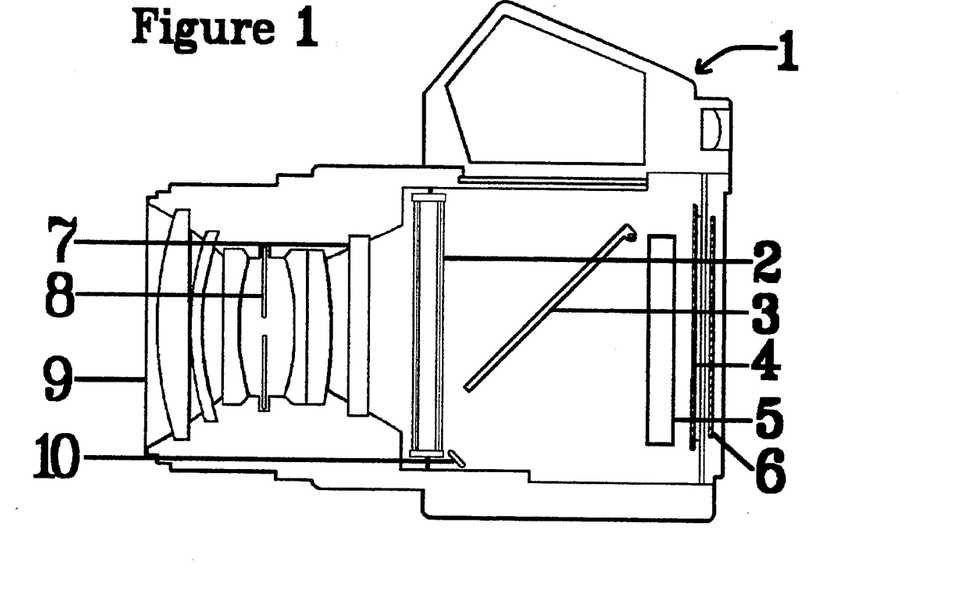

In the preferred embodiment, a light-sensitive, photochromic medium is placed in a camera in the light path between the lens and the film as in FIG. 1, No. 2. In using photochromic glass or plastic as the light-sensitive medium, the reactivity of said glass or plastic is enhanced by using a light trap. Said light trap (FIG. 2) comprises two dissimilar mirrors: a one-way mirror (No. 12) is placed before the glass, on the side facing the incoming light, and a full mirror (No. 16) is placed on the other side of the photochromic glass (No. 14). These components need not be in juxtaposition as long as they are in the optical path.

Figure 2:
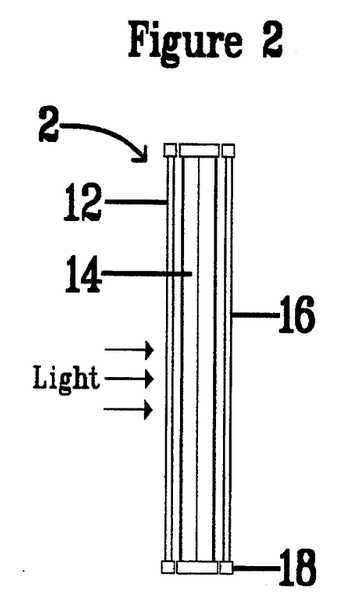

In the phase that darkens the here-to-fore transparent photochromic medium, the forward shutter (No. 7) is opened. Light enters the camera via the aperture (No. 8) and encounters the light-trap (No. 2) which is the combination of the two dissimilar mirrors. A proportion of the incoming light passes through the one-way mirror and the photochromic glass plate (No. 14). This light is reflected back by the posterior full mirror, again passing through the photochromic plate. The light is now mostly reflected back through the photochromic plate by the one-way mirror, completing one full cycle. This internal back-and-forth reflection continues until the aperture is closed and no more light is admitted inside the camera.

When the photochromic plate is sufficiently darkened corresponding to the intensity of the various objects in the imaging light, the mirrors are moved away from the plate and the film is exposed by opening the focal plane shutter (FIG. 1, No. 4). This removal of the posterior mirror (FIG. 2, No. 16) is necessary for the light to reach the film. The removal of the anterior mirror (FIG. 2, No. 12) allows more light to pass through the photochromic plate apparatus and permits greater film sensitivity. Said movements of said mirrors are readily accomplished by standard devices known to practioners of the craft.

Brighter objects tend to radiate more ultraviolet light than darker objects. Photochromic glass reacts to light energy in the ultraviolet and the shorter wavelength visible light range. Said photochromic plate reacts faster in the areas exposed to said light, darkening and impeding light ray transmission in the darkened areas. The resulting film exposure is thereby modified such that the brighter objects are attenuated to a greater degree by the intervening photochromic plate.

Figure 8:
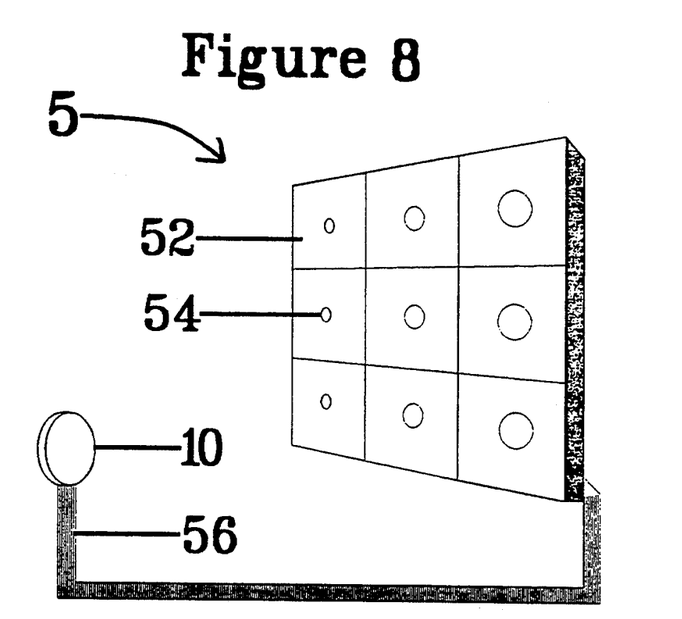

The camera's exposure-determining system calculates both the time needed to expose the photochromic apparatus prior to exposing the film, utilizing the forward shutter (No. 7), and the exposure time and aperture setting for optimum exposure of said film, utilizing the focal plane shutter (No. 4). A light meter array (No. 5, FIGS. 1 and 8) is utilized as a preferred embodiment. The photochromic apparatus is not initially in the optical path when the light meter array is first activated by opening the camera's light aperture. Light is partially reflected by the reflex mirror into the viewing device, and some light passes through the reflex mirror to the light meter array. The light meter array records the light intensity on each of its individual meters. Said array also reflects light from each individual section (FIG. 8, No. 52) onto the remote light meter represented by No. 10 in FIGS. 1 and 8. Said sections are individually inclined to reflect the light directly onto the remote light meter. An electrical connection (No. 56) unites the components of the meters.

The light going onto the remote light meter represents an average light value of the photographic field of regard. This value is measured against the light values of each of the component meters (FIG. 8, No. 54) comprising the light meter array. If an individual light value within the said array exceeds the average light value by more than the film's range of accommodation, then the photochromic medium is inserted into the optical path. The imaging light exposure of said medium is dependent upon the amount by which the remote light meter exceeds the average light value. After exposure of said medium, the average light value of the photographic field of regard is measured to set the exposure of the film. Light from the identical field of regard is used to expose both the photochromic medium and the film in separate exposures. The light meter workings are readily accomplished by those skilled in the art.

In order to take subsequent pictures with a shorter waiting interval, the system uses different photochromic devices sequentially, or different photochromic plates that are inserted separately between the mirrors (FIG. 2). The previously used photochromic plate or device can be recovering its transparency while subsequent photochromic plates or devices are employed. Said multiple devices can be built into the camera or inserted from the outside. A snap-in system allows the user to insert the photochromic device into the camera before taking a picture and remove it afterwards. The movements of said devices and plates are readily accomplished by standard devices known to practioners of the craft.

Figure 3:
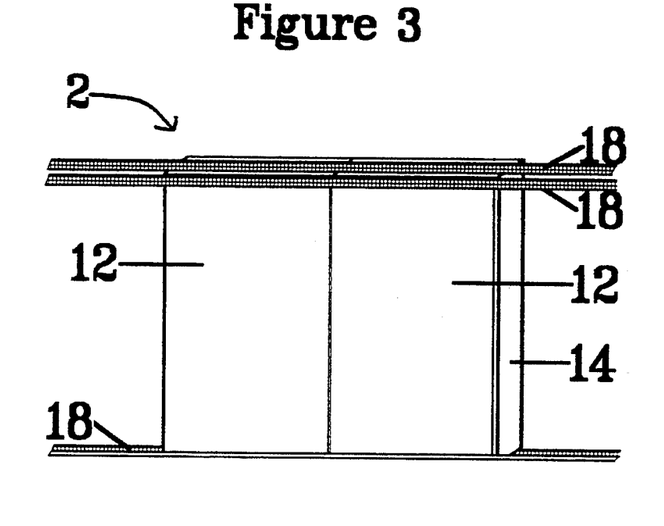
FIG. 3 is a schematic drawing of a photochromic device of FIG. 2 in frontal view. No. 2 represents the photochromic device. No. 12 represents the anterior one-way mirror. No. 14 represents the photochromic glass. No. 18 represents a track for moving photochromic glass or mirrors.
Figure 4:
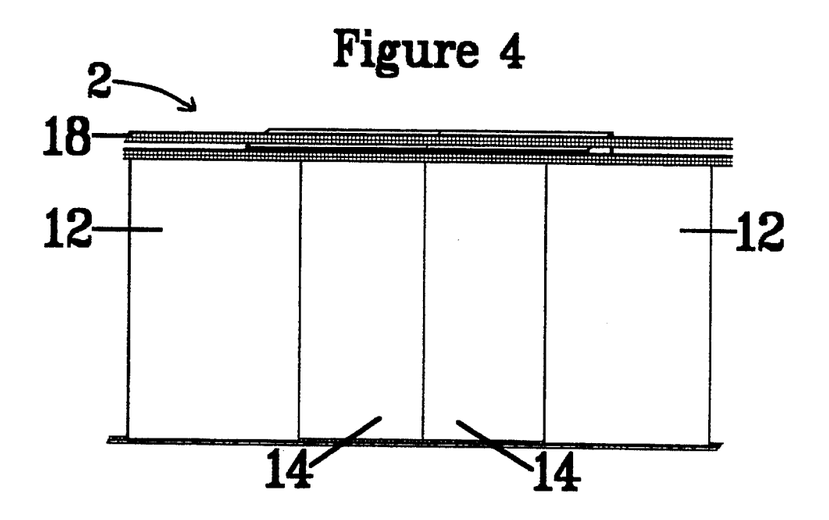
FIG. 4 is a schematic drawing of the photochromic device of FIG. 3 to show the mirrors retracted from the optical path. No. 2 represents the photochromic device. No. 12 represents a mirror on one side of the photochromic glass in the opened position. These mirrors are on tracks, indicated by No. 18. The photochromic plate is indicated by No. 14.

Because there is an appreciable time needed to return photochromic glass to a clear status before it can function in subsequent film exposures, additional mechanisms are desirable to accelerate this process when this glass is used as the photochromic element. Said mechanisms can be incorporated into the camera body itself for convenience of use. Placing the mirrors and the photochromic plate on a track (FIGS. 2, 3, and 4, No. 18) expedites moving these components.

One method for more rapid clearing of photochromic glass is to heat it in the absence of short-wavelength light. A transparent coating of a metal oxide is placed on the photochromic surfaces. Electric current is then passed through the oxide layer, resulting in heating and subsequent more rapid recovery of transparency of the photochromic element.

Another means for more rapid clearing of photochromic glass is by exposure to long photopic wavelength light and infrared light. Said light can be external light through the camera's lens such as daylight filtered to exclude shorter wavelengths of light (FIG. 1, No. 9). Alternately, a specific illuminating source can be incorporated into the camera itself. Photochromic glass clears faster with exposure to long photopic wavelength light and infrared light, and this effect can be accelerated by use of the two mirror mechanism described previously and illustrated by FIGS. 2, 3, and 4.

Photochromic glass is activated to darken by the shorter wavelengths of visible light and by ultraviolet light. The range of light sensitivity can be extended by altering the chemical composition of the glass. Additional properties can be designed into specific photochromic glass, such as optimum response to light exposure and optimum rate of clearing to accommodate various photographic requirements. Details are available from the Corning Glass Works of Corning, N.Y.

Figure 6:
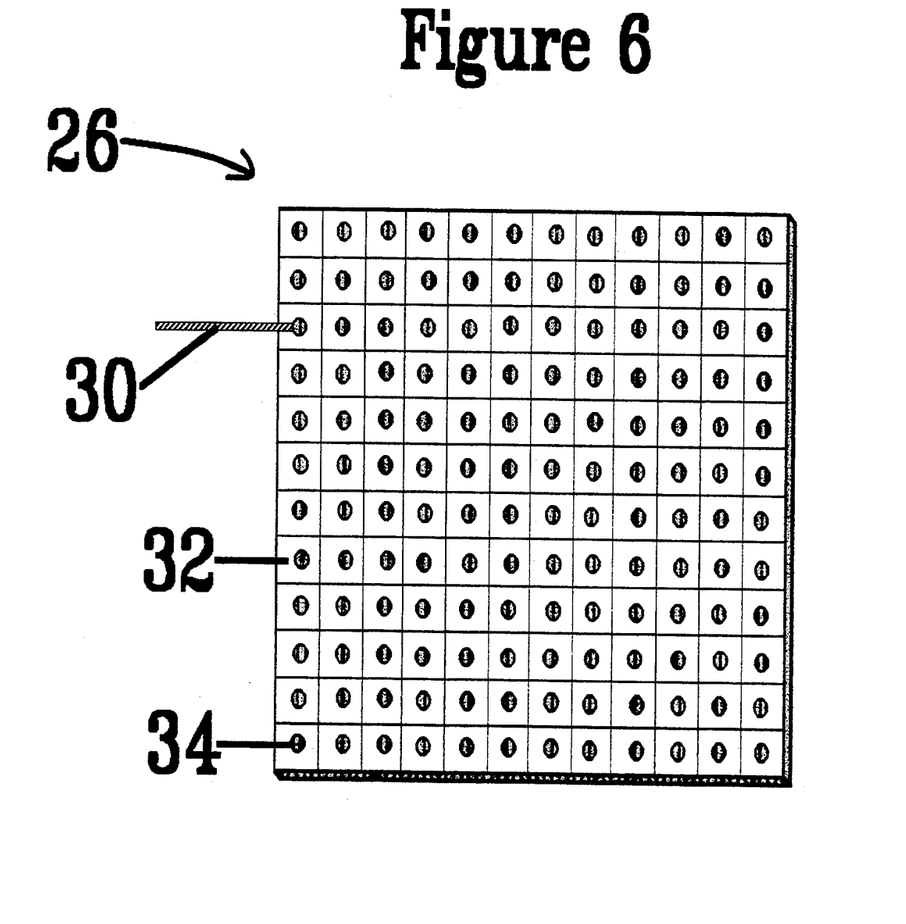
FIG. 6 is a schematic drawing of the photocell array of FIG. 5, No. 20, seen from the front. No. 26 represents the photocell array. No. 30 represents an electrical conducting media for the output from an individual photocell. No. 32 indicates an area represented by a photocell. No. 34 indicates a photocell.
Figure 7:
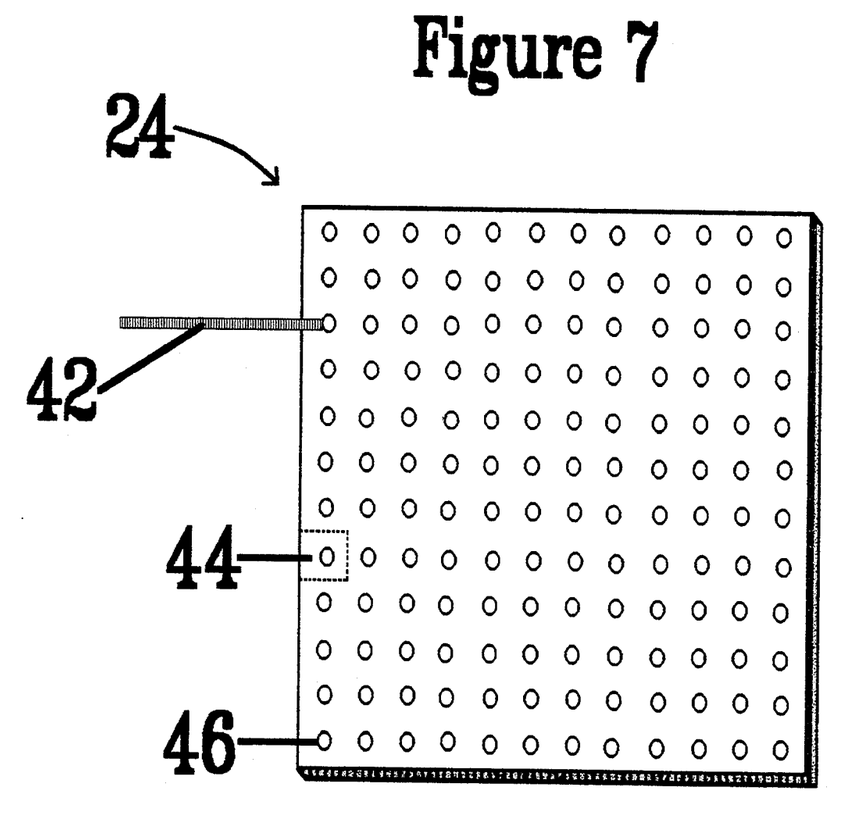
FIG. 7 is a schematic frontal drawing of FIG. 5, No. 24 indicates a liquid crystal plate. No. 42 represents a transparent electrical conducting medium that attaches to a segment of the liquid crystal plate. No. 44 represents a segment of the liquid crystal plate that corresponds to a similarly located segment, No. 32, of the photocell array of FIG. 6. No. 46 indicates an electrical attachment point on the liquid crystal array.

In another embodiment, (No. 20, FIG. 5), the photochromic device comprises three different elements: a polarized glass, No. 22, a liquid crystal assembly, No. 24, and a photocell array, No. 26. Each unit of the photocell array, as per FIG. 6, No. 34, produces an electrical current proportional to the intensity of the incident light, said current is conducted by a wire (No. 30). This current is delivered to the corresponding area of the liquid crystal display by a transparent electrical conducting medium, as per FIG. 7, No. 42, attaching at places represented by No. 46., causing the liquid crystals to align at a different angle than the polarizing glass. A segment containing a photocell on the photocell array (FIG. 6, No. 32) corresponds to the same geographical segment on the liquid crystal assembly (FIG. 7, No. 44). As said angle in a liquid crystal unit changes with electrical activation, light is restricted in transmission proportional to the angle between the alignment of the polarizing glass and the aligned crystals. Those skilled in the art can readily assemble the components and electrical connections to achieve the desired darkening of the image that falls on the photochromic device.

The photocell array is moved out of the path of the light going to the film or film-equivalent of the camera before exposure of said film. This is achieved by having said array in two parts that move sideways, as per the preferred embodiment described previously (FIGS. 3 and 4). Alternately, said array can be hinged so as to swing out of the way of the light that will expose the film. Alternately, said array can be located on the reflex mirror assembly (FIG. 1, No. 3) and activated by light that passes through a partially light transmitting mirror on said reflux assembly. Said assembly is removed from the optical path during film exposure. Said movements of the above mentioned components are readily accomplished by standard devices known to practioners of the craft.

The electrical connections are maintained during the exposure of the film to continue the flow of current that keeps the liquid crystals at the proper angle to the polarized glass. The circuit maintains the current at the level it achieves just before the film exposure takes place, and then the photocell array is removed from the path of the light.

After the exposure of the film, the cessation of the flow of current or the reversal of polarity of the current causes the liquid crystal display to return the alignment to the resting state, which is parallel with the alignment of the polarizing glass. This readies this element for the next photographic exposure.

It is not necessary for the photocell array to be in the direct light path in the camera. A beam-splitting device can direct a portion of the incident light from the usual path onto the photocell array located elsewhere. The electrical connections between the photocell array and the liquid crystal: polarized glass combination accomplishes the desired darkening relative to the intensities recorded by the individual photocells.

Figure 5:
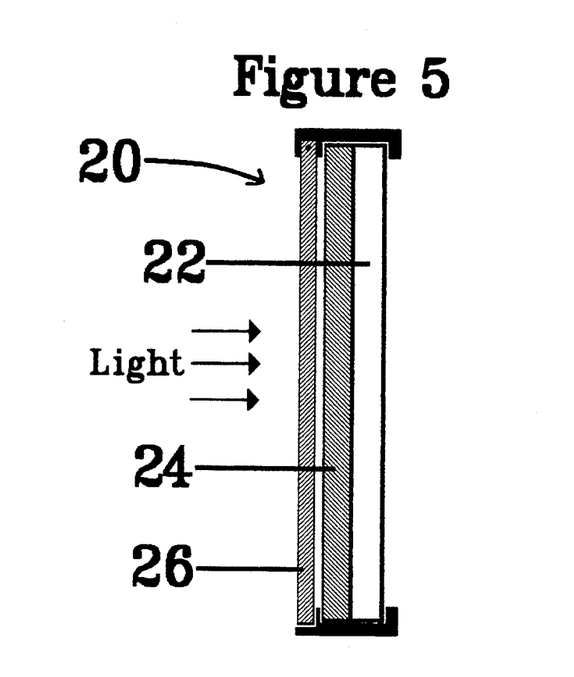
FIG. 5 is a schematic sagittal view of a different photochromic device that can be placed in the same position in a camera as is No. 2. This device is indicated by No. 20. The components are a polarizing glass, No. 22, a liquid crystal assembly, No. 24, and a photocell array, No. 26.

The photochromic device described above contains many or few segments, corresponding to the desired quality of the effect of producing a temporary, intermediate image that moderates the exposure of the film. This embodiment has the added feature of polarizing the light (No. 22) that exposes the film, reducing glare. For more effect, two polarized plates can be utilized instead on only one.

Another embodiment of the optical means is the use of photographic film as the photochromic element of the device. After pre-exposure imaging, said film is rendered stable by chemicals that fix its image. A subsequent opening of the camera's aperture causes the final imaging light to be moderated by said pre-exposed image.

OPERATION OF INVENTION

The preferred embodiment of this invention is a transparent photochromic device that temporarily holds an image after photographic-type exposure to a scene by becoming partially light-blocking consistent to the intensity of the light on each area of the photochromic material. While this image is present on the photochromic plate, a subsequent exposure of the same scene is made that reaches the film of the camera. The exposure of the film is moderated by the temporary image on the photochromic plate. The camera's metering system adjusts the total light needed to expose the film, and sets the time and aperture of both the photochromic plate exposure and the subsequent film exposure. The two exposures are made in as short a sequence as possible so that the camera will have little opportunity to move during the process.

The photochromic device is used only when required, that is, when there is a large discrepancy in the light values in a scene, as measured by the previously described metering devices. The photochromic device is readily moved away from the path of light that exposes the film or it can be designed to be removed completely from the camera. Multiple devices can be utilized so that subsequent exposures can be made while the previous plates are returning to ambient status. Multiple photochromic plates can be alternately put between the two mirrors while previously exposed plates are returning to pre-exposure status.

A photochromic plate is only a preferred embodiment of a device that is placed between a camera's aperture and film to moderate light relative to the intensity of objects in the field of regard.

Another embodiment of the photochromic device is the use of a combination of a polarizing glass or glass-equivalent, a liquid crystal assembly, and a photocell array. Said embodiment is preferred in camera devices that require the rapid taking of multiple pictures, such as in movie cameras and video cameras. Said liquid crystal assembly cycles more quickly than the photochromic glass device previously described. Combined with a light-splitting prism or mirror, the photocell array can be located outside the main light path that exposes the film.

Another use of the optical means of this invention is in making photographs from negatives. The photochromic medium is inserted in the optical pathway for a time sufficient to make a temporary image that corresponds to the negative. Then the light is transmitted through to the photographic paper, moderated by the temporary image on the photochromic medium. The result is a print that is better exposed for wide latitudes of light in the scene.

Having described the invention, many modifications thereto will become apparent to those skilled in the art to which it pertains without deviation from the spirit of the invention as defined by the scope of the appended claims.

CONCLUSIONS AND SCOPE OF INVENTION

The herein described invention allows good exposure of all areas of a photographic film or image-sensitive element despite a large variation in the incident light.

Said invention can be incorporated in all manner of photographic devices and not just still cameras. It can be incorporated into movie and video cameras. It can be used in enlarging photographic devices in which an exposed negative has a large range of light exposures. Instead of selecting one aspect of the negative and making prints accordingly, the photochromic plate allows all areas of the negative to expose the print properly.

The invention permits correction of exposure imbalance in film or video by transferring the imbalanced film to other film after passing the light through one or a series of photochromic plates.

While the above invention contains many specifics, these should not be construed as limitations on the scope of the invention, but rather as an exemplification of some preferred embodiments thereof. Other variations are possible. Accordingly, the scope of the invention should be determined not by the embodiments illustrated, but by the appended claims and their legal equivalents.

I claim:

1. An image control device in a photographic apparatus comprising:
   (a) a transparent photochromic medium that is interposed in the internal optical path, and
   (b) a mirror before said medium that transmits light coming from anterior to posterior but reflects light coming from posterior to anterior, and
   (c) a mirror behind said medium that reflects light forward, and
   (d) the mirrors in multiple parts which fit together into the optical path when brought together, and
   (e) the photochromic medium in multiple parts which fit together into the optical pathway when brought together.

2. The image control device of claim 1 wherein said device is incorporated in the optical path of photographic apparatuses, comprising:
   (a) cameras,
   (b) video cameras,
   (c) image projectors,
   (d) photographic enlargers, whereby the range of light value contrasts of a subject image on a photorecording medium is reduced by transmission through the photochromic medium which has had prior exposure to said subject image.

* * * * *